May 13, 1941.  H. SCHMITT  2,241,741
LICENSE TAG ILLUMINATING AND SIGNALING DEVICE
Filed Nov. 29, 1939
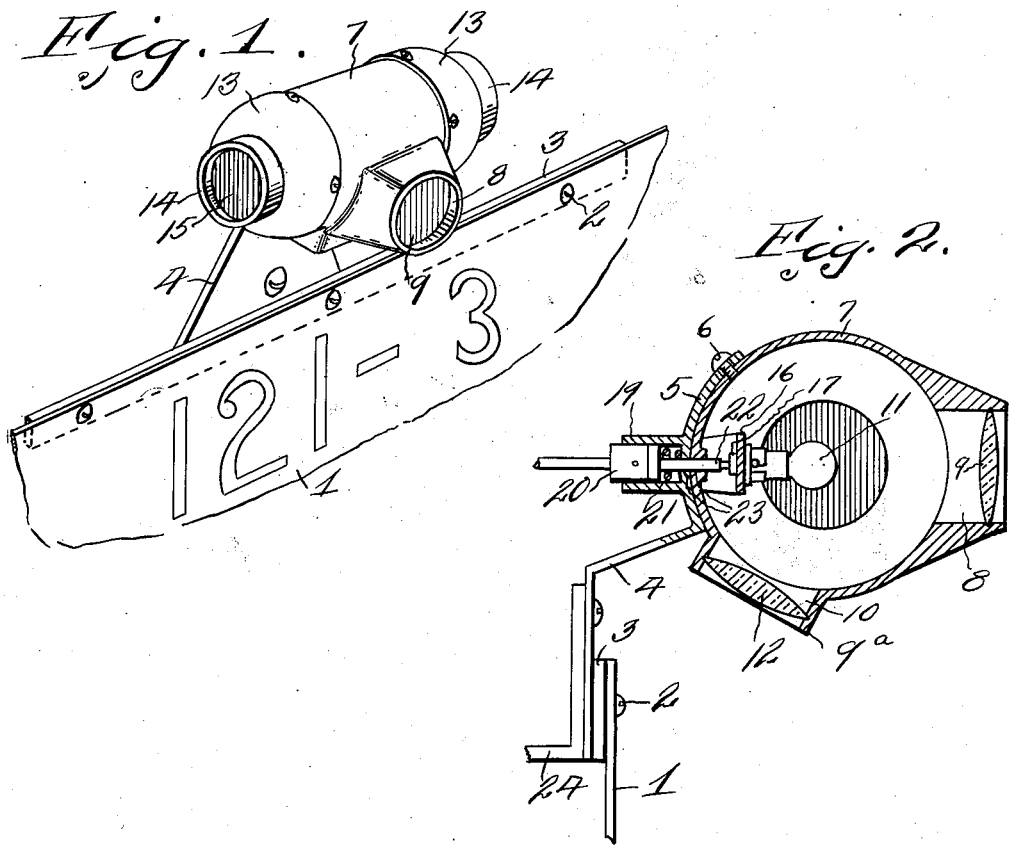
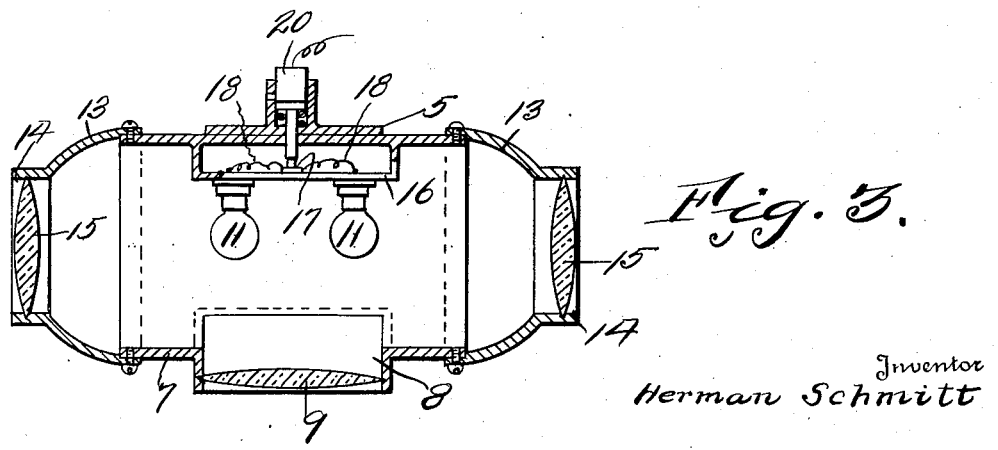
Inventor
Herman Schmitt
By Philip A. H. Serrell
His Atty.

Patented May 13, 1941

2,241,741

UNITED STATES PATENT OFFICE 2,241,741

LICENSE TAG ILLUMINATING AND SIGNALING DEVICE

Herman Schmitt, Sheboygan, Wis.

Application November 29, 1939, Serial No. 306,726

1 Claim. (Cl. 240—8.3)

The invention relates to license tag illuminating and signaling devices, and has for its object to provide a device of this character comprising a casing supported above and forwardly of the license plate and provided with means whereby light rays will be projected rearwardly as a signal to approaching vehicles; means whereby light rays will be projected downwardly and rearwardly on the license plate for illuminating the same and means whereby light rays will be projected transversely from either end of the casing as side signals to vehicles approaching at an angle.

A further object is to form the casing from a cylindrical chambered body having illuminating means therein and the ends of the body with removable cup shaped members having light openings therein.

A further object is to provide a lamp supporting bracket within the chamber of the cylindrical body and supporting spaced lamps in circuit with a contact on the inner side of the bracket and a separable connector cooperating with said contact from the outside of the casing.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:

Figure 1 is a perspective view of the device, showing the same supported above a conventional form of license plate.

Figure 2 is a vertical transverse sectional view through the illuminating and signaling device.

Figure 3 is a horizontal sectional view through the illuminating and signaling device.

Referring to the drawing, the numeral 1 designates a conventional form of license plate, attached by means of screws 2 to a transverse brace bar 3. The brace bar 3 is provided with an upwardly and forwardly extending bracket arm 4, which terminates in an arcuately shaped plate 5 having its concave side rearwardly disposed. Secured within the concave side of the plate 5 by means of screws 6 is a horizontally disposed cylindrical body member 7 of the light. The rear side of the casing 7 is provided with an elongated opening 8 through which light rays pass and disposed within said opening is a lens 9, preferably red and spaced inwardly from the outer end of the opening 8 so it will not be observed by vehicles approaching at right angles, but will be within the range of vision of vehicles approaching from the rear.

The under side of the casing 7 is provided with an annular member 9ª having a chamber 10 therein. The annular member 9ª has its axis extending downwardly and inwardly so that light rays from one of the lamps 11 will be directed onto the face of the license plate for illuminating the same. Disposed within the annular member 9ª is a lens 12, preferably white and positioned whereby it will not be seen by other vehicles approaching on courses at an angle from either side.

The ends of the cylindrical body member 7 are closed by means of semispherical members 13 having axially alined flanged openings 14, and disposed within the flanged openings and spaced inwardly therefrom are lenses 15, preferably red, and adapted to project light rays transversely to each side of the vehicle as a danger signal to approaching vehicles from either side. Therefore, it will be seen that a rear signal is given from a single source of light, and in addition the license plate is illuminated and transverse danger signals are at the same time given.

The lamps 11 are of conventional construction and supported on a U-shaped bracket 16 carried by the inner periphery of the casing 7 at the rear side thereof. The bracket 16, on the inner side of the transverse portion thereof, is provided with a contact member 17 in circuit with the lamps 11 through the wires 18. The system is preferably a one wire system. The arcuate plate 5 is provided with an outwardly extending chambered member 19 for the reception of a conventional form of connecting plug 20, which acts against the expansive action of the spring 21. Plug 20 is provided with an extension member 22 of conductor material which extends through the apertures 23 and into engagement with the contact member 17.

The license plate and illuminating device is supported by a conventional form of bracket 24, which may be attached to the automobile in any suitable manner.

From the above it will be seen that a license tag illuminating device and rear and side signaling device is provided which is simple in construction and one wherein all of these functions are obtained from a single light.

It is to be understood that the four way light box may have lens of any color desired and that the particular colors indicated may be varied. The side lenses 15 however are preferably red to act as danger signals to cars approaching from either side, for instance at intersecting roads and the lens 9 is preferably red, however if the light box is used on the front end of the machine this color may be varied. The bottom lens 12 is preferably uncolored to get the maximum amount of light rays on the license plate. The device is primarily a safety signaling one.

The invention having been set forth what is claimed as new and useful is:

A combined signaling light and license plate illuminating device, said device comprising a cylindrical casing, means for supporting said casing above and spaced outwardly from the front of the license plate, said casing having a source of light therein, a light ray opening in the under side of said casing, a flange around said light ray opening inclining downwardly and inwardly towards the outer face of a license plate, axially disposed light ray openings in the ends of said casing and having their axis in a horizontal plane, said last named light ray opening being surrounded by flanged members whereby the lights can not be seen from the rear at a right angle thereto, a flanged rearwardly extending light ray opening carried by the rear side of the casing, inwardly disposed lens in said flanged members, a supporting bracket for the cylindrical casing, said bracket terminating in an arcuately shaped plate secured to the casing, said plate conforming to and engaging said casing, a plurality of lamps within the casing in circuit with each other, a U-shaped bracket within the casing and carried by the casing and on which said lamps are mounted, a contact point insulatedly carried by the inner side of the transverse portion of the U-shaped bracket and electrically connected to the central contacts of the lamps and circuit connection means connected to said contact point and passing through said arcuate portion and casing.

HERMAN SCHMITT.